INVENTORS.
Shunsuke Fukada
Toru Nakanishi

BY *Paul + Paul*

ATTORNEYS.

INVENTORS.
Shunsuke Fukada
Toru Nakanishi

BY Paul + Paul
ATTORNEYS.

INVENTORS.
Shunsuke Fukada
Toru Nakanishi

ATTORNEYS

United States Patent Office 3,707,593
Patented Dec. 26, 1972

3,707,593
APPARATUS AND METHOD FOR MANUFACTURING CONTINUOUS FILAMENTS FROM SYNTHETIC POLYMERS
Shunsuke Fukada, Kyoto, and Toru Nakanishi, Ehime-ken, Japan, assignors to Toray Industries, Inc., Tokyo, Japan
Filed Apr. 2, 1970, Ser. No. 25,149
Int. Cl. B28b 3/20; D01d 5/12
U.S. Cl. 264—210 F                                    13 Claims

ABSTRACT OF THE DISCLOSURE

An apparatus and method are provided for manufacturing continuous synthetic polymer filaments which are especially useful in the preparation of non-woven products. The apparatus of this invention is comprised of an elongated closed cylinder which has a spinneret assembly at an upper end thereof, an exit nozzle at a lower end thereof and means for introducing a compressed fluid into the interior of the cylinder so as to form a pressurized chamber within the cylinder. In the method of this invention, the polymer is spun into filaments by the spinneret assembly. The spun filaments are then cooled and solidified by the compressed fluid in the chamber. The solidified filaments then exit through the exit nozzle along with a portion of the compressed fluid which causes the filaments to be drawn so as to improve their physical properties.

BACKGROUND OF THE INVENTION

(1) Field of the invention

This invention relates to a method and apparatus for manufacturing synthetic polymer filaments for use in non-woven products.

(2) Description of the prior art

The use of non-woven products is expanding rapidly. The uses most recently suggested for non-woven products have required that the non-woven products be considerably more uniform in properties than was heretofore necessary, especially with regard to thickness and dimensional stability. It is further to be anticipated that the specifications for the non-woven products will become even more restricted in the immediate future. One of the problems encountered in manufacturing non-wovens is that when the synthetic polymers are spun into filaments as an integral part of the non-woven manufacturing process, it has heretofore been difficult if not impossible, to obtain filaments having the high degree of orientation required in order to have satisfactory physical properties for use in non-wovens.

Various methods have been suggested in the prior art to improve the orientation of the filaments used in non-wovens. One such process included taking up the filaments as they were spun on a high speed rotary roller in an attempt to achieve a high degree orientation in the filaments. The spinning speed was determined by the peripheral speed of the take-up roller. This process had certain distinct disadvantages. While it was possible to make the peripheral speed of the roller more than several thousand meters per minute, apparatus with such high speeds was very large and dangerous to operate. In addition, when the filaments broke they wound about the roller and had to be removed which reduced the operating efficiency of the process. Accordingly, at present, the commercially used apparatus of this type is operated at most up to about 2500 meters per minute. This speed is, however, not sufficient to achieve a high degree orientation in the filaments since it is necessary that the take-off speed be at least several thousand meters per minute in order to obtain a satisfactory degree of orientation. Furthermore, the bundles of filaments after contacting the high speed take-up roll, were difficult to separate into individual filaments. Accordingly, it was difficult, if not impossible, to obtain a homogeneous sheet using the filaments prepared by this process.

An additional process which has been suggested is disclosed in Japanese patent publication No. 499/1962; Japanese patent publication No. 11,293/1963 and Japanese patent publication No. 6,312/1966. In this process, the filaments are transferred by utilizing frictional power of a moving fluid on the filaments. Using this process, it is possible to have the take-up speeds of the filaments relatively high. However, certain difficulties have been encountered in controlling the speed of the filaments. In addition, when the pressure of the filaments is increased, in order to increase the orientation of the filaments, problems are encountered in collecting the filaments because of scattering and disturbance of the filaments. These problems have brought about problems in catching and collecting the filaments so as to form a homogeneous non-woven sheet. Furthermore, by this process take-up speeds of 4,000–5,000 meters per minute is the industrial limit and in addition, it has not been possible to make bundles of filaments of relatively large deniers.

It is an object of the present invention to overcome the aforementioned problems and difficulties encountered with the prior art apparatus and methods.

It is a more specific object of this invention to provide apparatus and a method for manufacturing synthetic fibers having a high degree of orientation for use in non-woven products.

It is a more specific object of this invention to provide a technology for efficiently producing homogeneous and non-woven products from large denier continuous filaments.

Other objects and advantages of the present invention will become further apparent from an examination of the drawings and a review of the specification and sub-joined claims.

BRIEF SUMMARY OF THE INVENTION

The objects of this invention have been achieved by providing an apparatus and method wherein molten spun filaments are contacted in a closed pressurized chamber with a compressed fluid which both cools the filaments and causes the filaments to be drawn to a highly oriented state.

DESCRIPTION OF THE PREFERRED EMBODIMENTS

Figure 1:
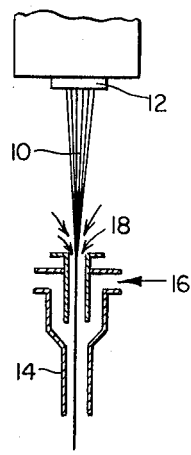
FIG. 1 is an illustration in partial cross-section of a conventional filament ejector of the prior art.

In accordance with the teachings of this invention, an apparatus and method is provided for manufacturing continuous synthetic polymer filaments for use in the preparation of non-woven products. The apparatus of this invention is comprised of an elongated closed cylinder which has a spinneret assembly at an upper end thereof, an exit nozzle at the lower end thereof, and means for introducing a compressed fluid into the interior of the cylinder so as to form a pressurized chamber within the cylinder. In the method of this invention, the polymer is melt spun into filaments by the spinneret assembly. The filaments are then cooled and solidified by the compressed fluid in the chamber. The cooled solidified filaments then exit through the exit nozzle along with a portion of the compressed fluid which causes the filaments to be drawn so as to improve the physical properties thereof. In the present invention, the orientation of the fibers is considerably higher than that which can be attained when the conventional type of ejector process is utilized. Accordingly, the various fiber characteristics are likewise considerably improved.

In the method of the present invention, the force of a jet stream from the sealed chamber is utilized to advance the filaments. The forces acting on the filament in the chamber are constant and are not likely to be effective by various external forces. In addition, it is possible, using the process of the present invention to effectively exert a stronger force on the filaments being processed and was heretofore possible using the prior art processes and apparatus. Using the process of the present invention, it is possible to obtain bundles of relatively large denier filaments which are highly oriented. In addition, the process of the present invention can be effectively used to obtain bundles of highly oriented small denier filaments and, as compared with the conventional ejector process, less than ½ the amount of compressed fluid need be used.

In the preferred embodiments of this invention, the exit nozzle is at least 20 mm. in length in order to obtain the optimum increase in the degree of orientation of the filaments. In addition, the discharge rate of the melted polymer is related to the distance between the spinnerets and the exit nozzle so as to properly cool the filaments and prevent fusion thereof before the filaments enter the exit nozzle. The proper relationship of the discharge rate and the distances between the spinneret and the exit nozzle can be determined by the following formula $$1.5L + 0.05 \leq M \leq 5.5L + 2.25 \quad \text{(i)}$$

$$L \geq 0.30 \quad \text{(ii)}$$

wherein L is the distance between a spinneret and the exit nozzle measured in meters and M is the rate of discharge of the synthetic linear polymer per spinneret in grams per minute. The above formulas are especially useful in preparing non-wovens from synthetic linear polymers of the polyester series.

A further item must be given careful attention in order to obtain the optimum results in the process of the present invention. It is the position of the orifices through which the compressed fluid is introduced into the chamber. The orifices for the compressed fluid should be positioned at least ½ of the distance from the spinnerets to the exit nozzle in order to reduce the percent elongation of the filaments. Most preferably, the location of the exit orifices is at a point in the lower portion of the chamber which is immediately adjacent the exit nozzle. When it is desired to have the final filaments in a more separated condition for use in the manufacture of non-woven products, it is preferable to form the apparatus of this invention with a plurality of exit orifices in the lower end of the chamber. The filaments from the spinneret are then fed into the separate exit nozzles and the product is jetted out in a more divided condition.

The term non-woven sheet, as employed in the present invention, refers to structures which consist of continuous filaments made of a synthetic linear fiber forming polymer. The filaments which comprise the non-woven sheet are more or less randomly positioned with a greater part of the individual filaments in the sheet being separated from one another. The non-woven sheets of this type are similar to the structures which are defined in Japanese patent publication No. 4,933/1962. The non-woven sheets prepared according to the present invention is processed further by being heated to its fusion point or being treated with a suitable adhesive. The non-woven, sheet prepared according to the present invention, is useful in the manufacture of clothing, padding, carpeting, curtains, interior decoration and various other uses.

Figure 2:
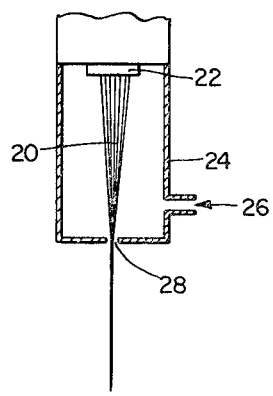
FIG. 2 is a schematic illustration in partial cross-section of the ejector apparatus of this invention.

Initially the characteristics of the apparatus of the present invention will be compared with the conventional prior art ejector apparatus. Referring to FIG. 1, this is an illustration which shows the principal of the ejectors of the prior art. FIG. 2 is an illustration which shows the principals of the ejectors of the present invention.

In FIG. 1, a synthetic linear polymer filament 10 is extruded from a spinneret 12 and cooled and solidified until it reaches an ejector 14. It is then pulled by a compressed air stream 16 blown into the ejector 14 and discharged from the lower end of the ejector. Uncompressed air entered the upper open end of the ejector as shown by arrows 18. This uncompressed air stream shown by the arrows 18 reduces the energy of the compressed air stream 16. In order to increase the degree of orientation of the filaments 10, the energy of the compressed air stream 16 must be increased to compensate for the loss of energy. The critical balance of the dimensions of the lower open amount of compressed air and cause a phenomenon to occur in which the compressed air stream 16 blows out of the upper end opening causing the alignment of the filaments to be distorted. Accordingly, with the prior art process, there is an upper limit to the degree of orientation of the filaments which can be obtained and there is also an upper limit to the deniers of the filaments which can be treated. Because the conventional ejector process has these structural defects, as mentioned above, when the size of the filament exceeds 6 denier, it becomes difficult to obtain highly oriented filaments.

In the apparatus of this invention, as shown in FIG. 2, and in accordance with the process of the present invention, filaments 20 are spun from a spinneret 22 directly into a sealed pressure chamber and are cooled inside the chamber 24 with a compressed fluid 26. The filaments 20 are jetted from the chamber 24 together with the compressed fluid 26 through the nozzle 28 provided at the lower end of the pressure chamber 24. Using the apparatus of this invention, the problems of the prior art are not encountered. In addition, large denier filaments may also be oriented using this apparatus.

Figure 3:
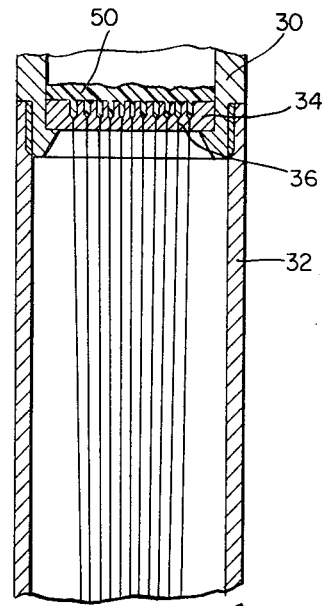
FIG. 3 is a longitudinal cross-sectional illustration of a first embodiment of the apparatus of the present invention.
Figure 3:
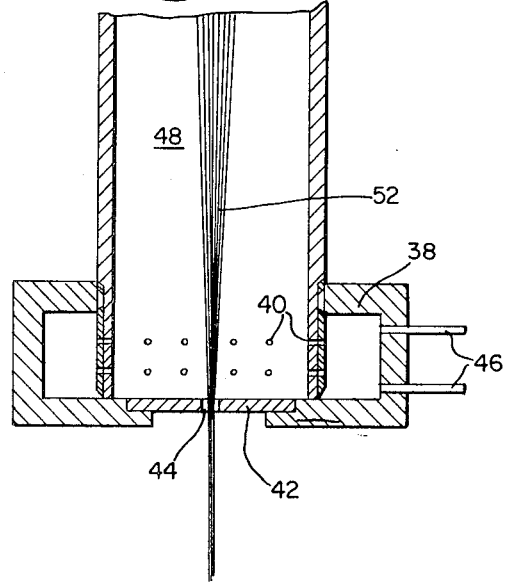

FIG. 3 is a longitudinal cross-sectional illustration of one embodiment of the present invention. The lower end of the spinneret assembly 30 and the upper end of the cylinder 32 are connected together in a gas tight fit. On the lower end surface of the spinneret assembly 30 there is mounted a spinneret plate 34 which contains a plurality of spinnerets 36. On the peripheral surface of the lower end of the cylinder 32, there is an annular compressed air distribution chamber 38. The compressed air distribution chamber 38 and the inside of the cylinder 32 are connected through small holes 40 in the lower end of the cylinder 32. On the lower terminal end of the cylinder 32, an exit plate 42 is mounted in a gas tight fit. At the center of the exit nozzle plate 42, a nozzle 44 is provided. The nozzle 44 connects the inside of the cylinder 32 with the outside. A compressed air supply pipe 46 is connected to the compressed air distribution chamber through which compressed air is supplied. The compressed air is introduced into the cylinder 32 through the small holes 40 via the compressed air distribution chamber 38 to form a pressure chamber 48. From the pressure chamber 48, the compressed air is jetted to the outside via the nozzle 44 in a manner such that the pressure in the chamber is constant. In the apparatus of FIG. 3, a fiber forming fluid 50 is extruded from the spinneret 36 to form filaments 52. The extruded filaments pass through the pressure chamber 48 where they are cooled and solidified by the compressed fluid and jetted to the outside together with a portion of the compressed fluid through the nozzle 42. During this period, the filaments 52 are oriented. The filaments, as they are jetted from the pressure chamber, are caught and collected to form a non-woven shape.

A distance of at least 10 mm. between the inner wall surface of the cylinder 32 and the spun bundle of filaments 52 is sufficient. However, this distance can be considerably larger, for example, 100 mm. The distance between the lower open end surface of the spinneret plate 34 and the upper end surface of the nozzle 44 is selected so as to be of a sufficient length for the bundle of filaments 52 to be sufficiently solidified so that the individual filaments will not adhere to each other as the bundle passes through the nozzle 44. If this length is too short, the bundle of filaments will stick together and will be jetted out from the nozzle 44 as a fused body. In this case, the degree of orientation of the filaments is substantially reduced. Accordingly, it is necessary to select the minimum distance between the spinneret 36 and the nozzle 44 by taking into account, the melting point of the fiber forming fluid, the rate of discharge and the temperature and the pressure of the compressed air. This is especially important when polymers having relatively low melting points such as polyethylene and polypropylene are used. Longer distances and a lower temperature compressed air becomes necessary with these materials. On the other hand, in the case of polyethylene terephthalates having relatively high melting points even though the distance between the nozzles is less than 500 mm. and the compressed air is at room temperatures, the process of the present invention can be practiced without difficulty. When the rate of discharge is increased, the cooling of the filaments 52 is lower. In this case, the distance between the spinnerets and the nozzle should be increased. Also in cases when the convection of the compressed fluid (for example compressed air) inside the chamber is too low because, for example the compressed air is overheated by the spinneret plate 34, the cooling of the filaments 52 may be insufficient. In such cases, the wall of the pressure chamber 48 may be gradually cooled or a part of the compressed air may be fed into an upper part of the chamber 48 by another pipe (not shown in the drawings).

Generally, the degree of orientation of the filaments 52 jetted out of the nozzle 44 varies depending upon the pressure of the compressed fluid supplied to the pressure chamber. The higher pressures result in more highly oriented filaments. However, it has been found that when the pressure of the compressed fluid is within a certain range increases in the pressure it does result in a corresponding increase in the orientation of the filaments. However, when the pressure exceeds a certain value, there is a tendency that the increased pressure will not cause a corresponding increase in the orientation. When such a tendency is recognized, certain steps may be taken. These steps will specifically be explained later utilizing FIG. 5.

Figure 4:
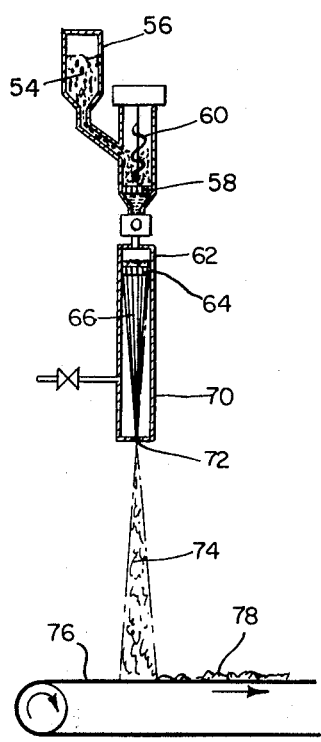
FIG. 4 is a schematic illustration of the apparatus and process of the present invention for preparing non-woven materials.

In accordance with the teachings of this invention, the apparatus and method of this invention are advantageously employed to make non-woven filamentary products. The method of preparing a non-woven sheet using the process of the present invention is schematically illustrated in FIG. 4. A synthetic polymer 54 is supplied to a hopper 56 in the form of chips. The chips from the hopper 56 are gradually fed to a heater 58 by a screw 60 in which the chips are melted. The molten polymer is fed to a spinning assembly via a measuring pump and extruded through a plurality of spinnerets 64 as continuous filaments. These filaments 66 contact a compressed fluid inside the pressure chamber 68 within the cylinder 70 and are cooled until the filament 66 will not adhere to each other. The filaments 66 are then jetted out of the pressure chamber together with the compressed fluid through a nozzle 72. The jetted out filament 74 are highly oriented. The filaments 74 fall into a moving wire mesh conveyor 76. The filaments 74 are arranged in a random manner on the wire conveyor 76 to form the non-woven sheet. The layer of filaments 78 is restricted on both sides and subjected to a heat treatment and certain other after treatments to dimension the sheet. It is important that the jetted out filaments do not shrink at low temperatures and should be highly oriented. It goes without saying, that the breaking of the filaments during formation of a non-woven sheet is not preferable since it reduces the production efficiency.

The heat shrinking properties of the filaments is obtained by immersing the filaments in boiling water. When the filaments are immersed under no tension in boiling water for 15 minutes, and the shrinkage is not more than 15%, hardly any problems are encountered using such filaments. As a criterion for judging the quality of high orientability, it is advisable to use the elongation at breakage of the filaments. If the elongation at breakage is normally not more than 100%, it is suitable for use in non-woven sheets having a weight of not less than 50 g./m.$^2$.

Figure 5:
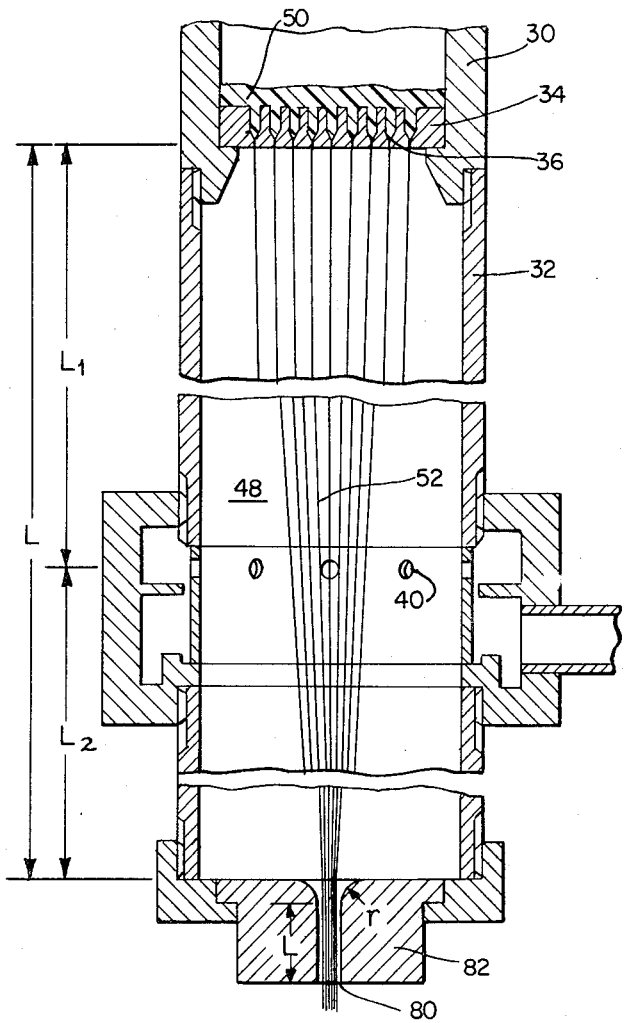
FIG. 5 is a longitudinal cross-sectional illustration of an additional embodiment of the apparatus of the present invention.

An additional embodiment of the present invention which is especially preferable when a high degree of orientation of the filaments is required is illustrated in FIG. 5. The numbers of corresponding parts of the apparatus of FIG. 5 are numbered so as to correspond with the similar parts of the apparatus of FIG. 3 and accordingly, a detailed explanation about the common structural elements will be omitted. The most important difference between the apparatus of FIG. 5 and the apparatus of FIG. 3 is that in the apparatus of FIG. 5, the length of the nozzle 80 is substantially longer than the corresponding part of FIG. 3. As shown in FIG. 5, when making the length of the flow passage of the nozzle 80 at least 20 mm. as compared with the case wherein said length is shorter than that, it is possible to advance the jetting out speed of the filaments from the nozzle 80 by 1,000–2,000 m./min.

Advancement of the spinning speed naturally occurs with an increase in the output. In addition, there is an improved drawing of the filaments which makes the denier and the final sheet properties more uniform. Furthermore, use of the apparatus of FIG. 5 reduces the compressed fluid requirements.

The diameter of the nozzle 80 should be selected by taking into account the material of the filaments, the desired degree of orientation and the denier of the filaments. Normally, a diameter within the range of 1–5 mm. is advantageous from a view point of preparation, cost and operability. When the diameter of the nozzle 80 is 4 mm., the number of orifices in the spinneret plate 34 should be 24 and the total rate of this discharge should be about 50 g./min. Since the amount of the compressed fluid consumed varies in proportion to the cross sectional area of the nozzle 80 and the number of filaments, it is uneconomical to make the nozzle 80 of a large diameter. However, when an extremely small diameter nozzle is used, as compared with the number of filaments, the filaments vigorously contact the interior surfaces of the nozzle which causes certain problems such as a substantial loss of energy and physical damage due to the filaments. It is also possible to change the diameter of the nozzle in the direction of jetting. For example, divergent nozzle can be used, but is difficult to design. Actually, in cases of a divergent nozzle having an extending angle of 5° or 10°, as compared with a straight nozzle having the same length of flow passage such as that shown in FIG. 5 the jetting out speed lowers by about 500–1,000 m. per minute. It is preferable that the entrance of the second nozzle 80 have a slight lead radius ($r$) in order to prevent the filaments from being caught on the edges around the entrance of the nozzle.

Generally, the longer the length of the flow passage of the nozzle 80, the greater will be the jetting out speed. When the length of the flow passage is extremely long, start-up of spinning becomes somewhat difficult. However, even if the length of the flow passage is somewhat long, the start-up of spinning is not impossible. For example, when the diameter of the nozzle 80 is 4 mm. and the length of the flow passages 1,000 mm., spinning can be started by aspirating the polymers from the outside of the nozzle 80. From the view point of the degree of orientation of the filaments operability and ease of preparation, a flow passage of about 50–300 mm. is especially preferable.

Upon supplying the compressed fluid, a tendency is often seen for the spinneret plate to become overcooled which causes breaking of the filaments. This phenomenon is observed when the temperature of the compressed fluid is low or when the pressure is high. This phenomenon can be prevented by maintaining the temperature of the spinneret assembly 30 at a temperature 10–40° higher than the desired temperature of the spinneret. For example, when polyethylene terephthalate is used, the temperature of the spinning assembly 30 is normally maintained at 280–290° C. When the aforementioned phenomenon occurs, it is preferably to maintain the temperature at 300–320° C. since by doing so a stable spinning state is obtained. Additional methods for preventing the aforementioned phenomenon include other means such as keeping the cylinder 32 warm and by using heated air or steam as a compressed fluid.

Figure 7:
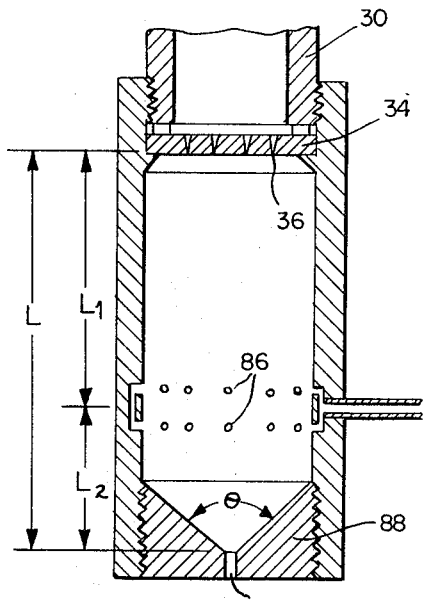
FIG. 7 is a cross sectional illustration of still another embodiment of the apparatus of this invention.

Embodiments which are especially effective in preventing fusion of the filaments to one another and for increasing the production efficiency, are illustrated in FIGS. 5 and 7. Corresponding parts of the apparatus of FIG. 7 are identified with the same numbers as the corresponding parts of the apparatus of FIG. 3. A detailed explanation concerning the common structural elements will therefore be omitted. A distinguishing feature of the apparatus of FIG. 7 as compared with the apparatus of FIG. 3 or FIG. 5 is that in the apparatus of FIG. 7, the upper surface of the nozzle 84 is formed in the shape of a funnel for purposes which will be pointed out below.

In FIGS. 5 and 7, the position of the orifices 40, 86 for the compressed fluid is illustrated with a distance L between the lower opened and surface of the spinneret plate 34 and the upper open surface of the nozzle 80, 84; a distance $L_1$ between the lower end opened surface of the nozzle 80, 84 and the orifices 40, 86 and a distance $L_2$ between the orifices 40, 86 and the upper end opened surface of the nozzle 80, 84. In FIG. 7, the orifices 86 are provided in two rows, the central point thereof which is taken as an imaginary position wherein the orifices are located.

When the amount of the molten synthetic polymer discharge from the spinneret 36 is large, sometimes the filaments fuse together as they are jetted out together with the compressed air from the nozzle 84. On the other hand, when the amount of the molten synthetic polymer discharged from the spinnerets is constant and the distance L between the spinnerets and the nozzle is small, the filaments jetted out from the nozzle may fuse together.

Figure 6:
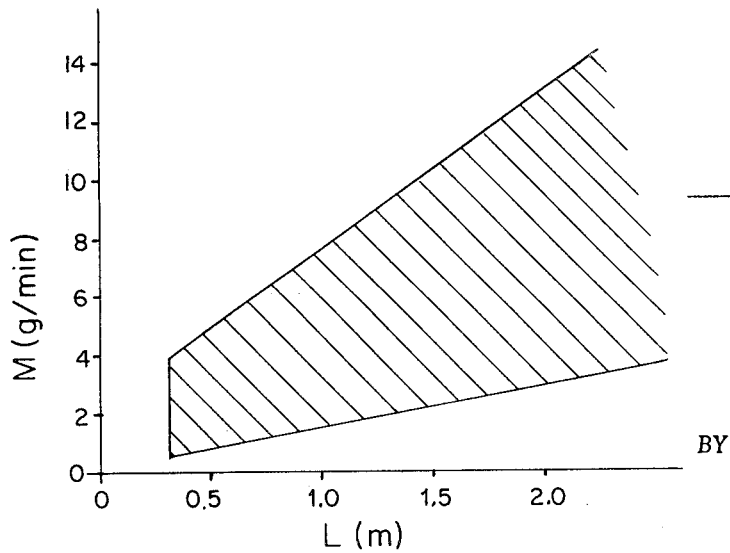
FIG. 6 is a graphic illustration showing the relationship of the discharge amount (g./min.) of a synthetic linear polyamide per orifice of the spinneret and the distance between the spinneret and the exit nozzle.

When this phenomenen occurs it is preferable to select conditioins satisfying the aforesaid Equations i and ii. When conditions shown by oblique lines in FIG. 6 are selected, for example, when the material is polyethylene terephthalate, it is possible to prepare a non-woven sheet consisting of filaments having excellent tenacity of at least 3.0 g./d., an elongation of not more than 70% and a shrinkage in boiling water of not more than 5%. A more stable state is obtained with smaller denier filaments of about 1 denier as a matter of course and also with larger denier filaments of for example, 10 denier. Further, the conditions of the aforesaid Equations i and ii provide very preferable conditions for forming a synthetic linear polymer filaments, especially polyethylene terephthalate filaments which are highly oriented and crystallized because the filaments are completely solidified in the vicinity of the exit nozzle and the solidified filaments are jetted out together with the compressed fluid.

The apparatus of FIG. 7, the funnel-shaped surface of the upper surface of the nozzle plate 88 is especially effective when breaking of the filaments takes place, in that the cut ends easily pass through the nozzle 84 and are discharged to the outside. In addition, the funnel shaped surface is highly effective for feeding the ends of the filaments at the time of start-up. In the event the angle $\theta$ of the funnel exceds 180°, the flow of the compressed fluid inside the cylinder tends to be disrupted.

When it is desired to especially reduce the elongation of the filaments, the position of the compressed fluid orifices are located so as to satisfy the following equation $$L_1 > \frac{L}{2} = \frac{1}{2}(L_1 + L_2) \qquad \text{(iii)}$$

wherein the distance between the lower end opened surface of the spinneret and the upper end opened surface of the nozzle is L; the distance between the lower end opened surface of the spinneret and the orifices is $L_1$ and the distance between the orifices and the upper end opened surface of the nozzle is $L_2$.

By so determining the position of the orifices, it is easier to fix a drawing point at a certain position. Moreover, the drawing point tends to be located in the vicinity of the nozzle. Therefore, the percent elongation of the filaments jetted out from the nozzle tends to become smaller.

Figure 9:
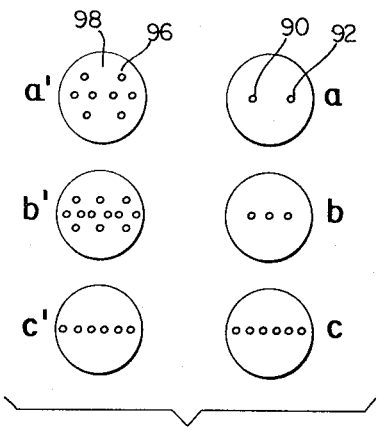
FIG. 9 is a plan view of various embodiments of the spinneret plate and the exit nozzle plate of the apparatus shown in FIG. 8.
Figure 8:
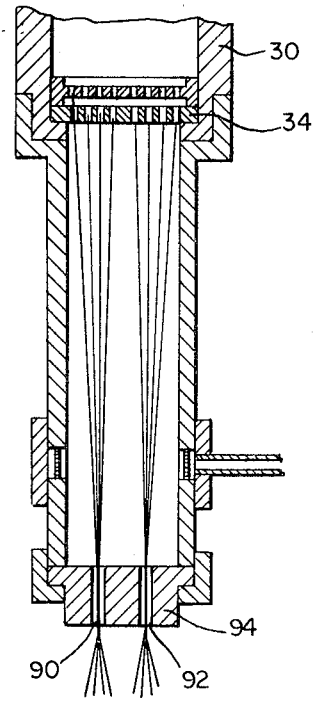
FIG. 8 is a longitudinal cross-sectional illustration of a further embodiment of the apparatus of this invention.

An embodiment which is especially effective for advancing the opening properties of the filaments when the filaments are jetted from the nozzle to form a non-woven sheet is shown in FIGS. 8 and 9. The apparatus shown in FIG. 8 differs from the apparatuses so far explained, in that in the apparatus of FIG. 8, two nozzles 90, 92 are provided in the nozzle plate 94. The spinnerets are likewise divided into two groups. This feature is shown in more detail in FIG. 9a and FIG. 9a'. FIG. 9a is a plan view of the nozzle plate 94 showing the two nozzles 92, 90 in the right and left positions. FIG. 9a is a plan view of the spinneret plate showing that the spinnerets are divided into right 96 and left 98 groups. When the opening properties of the filaments jetted from the nozzle, it is desired to be further increased it is advisable to use embodiments such as the nozzle plates and spinneret plates shown in FIGS. 9b, 9b' and 9c and 9c', wherein FIGS. 9b and 9c are plan views of the nozzles having 3 to 6 nozzles respectively. FIGS. 9b' and 9c' are plan views of the spinneret plates corresponding to these nozzle plates. For advancing the opening properties of the filaments, it is advisable to increase the number of nozzles. However, as the number of nozzles is increased, the start-up time for feeding the filaments through the nozzles is substantially increased. It is disadvantageous however to increase the number of nozzles at random. However, by using a nozzle plate having funnel-shaped portions such as that shown in FIG. 7, the disadvantages with regard to start-up time may be overcome. When the same number of spinnerets are used, the filaments obtained from the apparatus shown in FIG. 3, wherein there is one nozzle having a larger number of crimped filaments and many filaments whose degree of crimp is considerably larger than the filaments obtained using the apparatus shown in FIG. 8 wherein there is a plurality of nozzles. This is considered to be due to the angle at which the filaments extruded from the spinnerets are taken up. It is possible to prepare a non-woven sheet by taking advantage of the aforementioned tendencies of each of the respective apparatuses described above. When the number of nozzles is increased, the degree of orientation of the obtained filaments tends to be somewhat higher. This is considered to be due to the position at which the filaments contact the compressed fluid in the pressure chamber.

The embodiments shown in FIGS. 10, 11, 12 and 13 are especially useful for making non-woven sheets of a uniform thickness.

Figure 10:
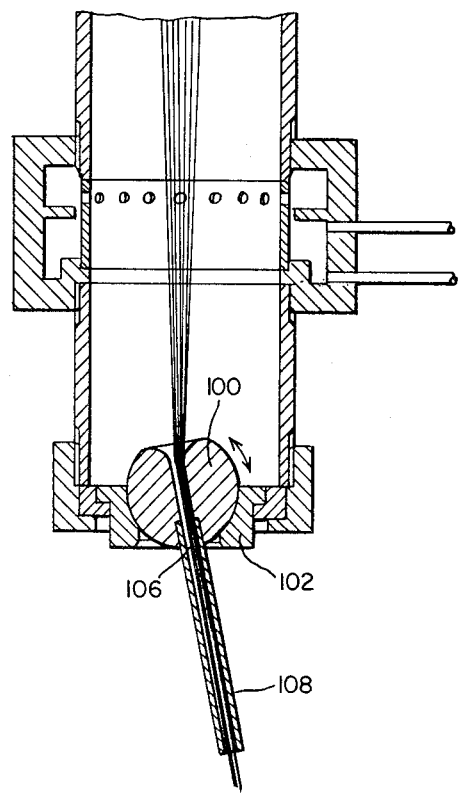
FIGS. 10 and 11 are partial longitudinal cross-sectional illustrations of still further embodiments of the apparatus of the present invention.

The apparatus partially illustrated in FIG. 10 is an apparatus according to the present invention which differs from the other embodiments with regard to the structure of the lower end surface of the pressure chamber 32. The lower surface of the nozzle plate 100 has a spherical surface and a supporting plate 102 is provided having a swivel seat in which the spherical surface is tightly mounted on the lower end surface of the cylinder 32. The nozzle plate 100 is freely movable in the swivel seat. In the nozzle plate 100, a nozzle 106 is provided. At the tip of the nozzle 106, an outlet pipe 108 is further provided.

Figure 12:
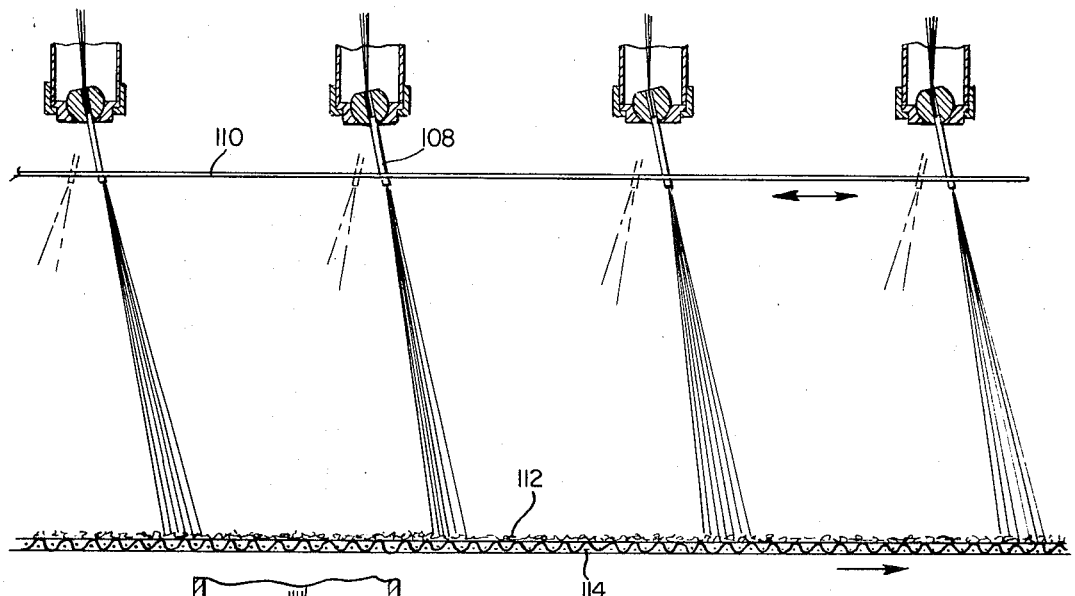
FIG. 12 is an illustration showing the preparation of a non-woven sheet using a plurality of the apparatuses shown in FIG. 10.

An assembly of a plurality of the apparatuses shown in FIG. 10 is shown in FIG. 12. Each of the outlet pipes 108 is connected to a connecting rod 110. Connecting rod 110 is shaken on both sides (structure for the shaking of the rod is not shown), causing each outlet pipe 108 to be shaken on both sides. The jetting out direction of the filaments from each pipe is thereby also shaken from side to side. A non-woven sheet 110 which is uniform in thickness is accumulated on the conveyor belt 114. It is also possible to make the motion of the outlet pipes 108 circular in nature. It is further possible to dispose each of the apparatuses jetting out the filament shown in FIG. 12, at right angles or oblique to the direction of the movement of the conveyor belt 114.

Figure 11:
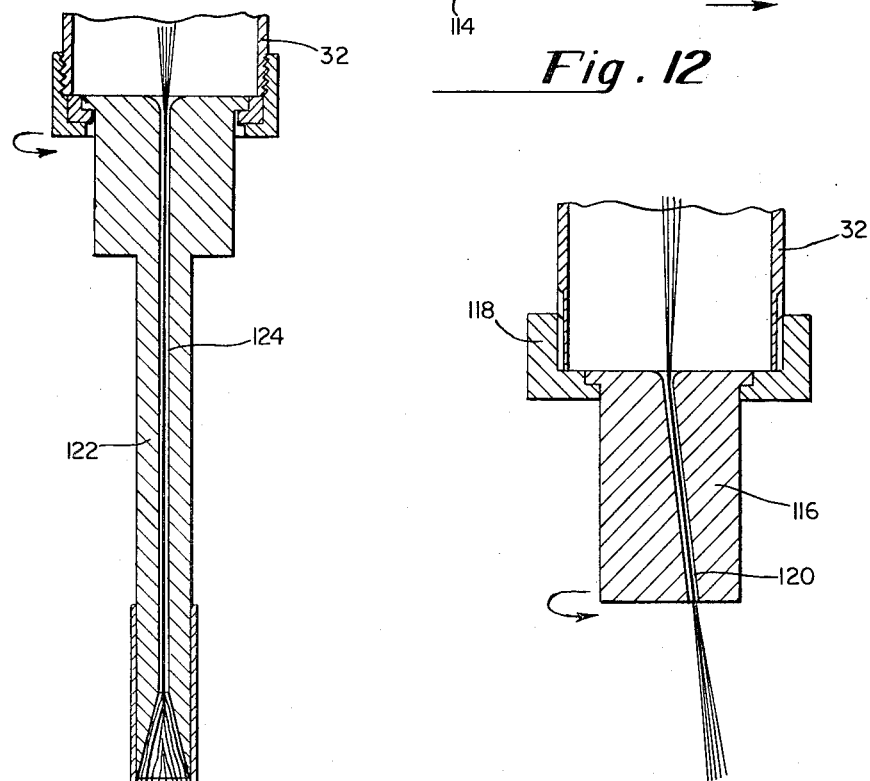

The apparatus shown in FIG. 11 is characterized, in that the nozzle plate 116 is formed by a column which is rotatably connected to the supporting plate 118 which is mounted on the lower surface of the cylinder 32. The nozzle 120 is oblique to the central axial direction of the nozzle plate 116. In this apparatus, the nozzle plate 116 is rotated about its central axis whereby the jetting out direction of the filaments from the nozzle is also rotated. This apparatus is advantageously used for preparing a uniformly thick non-woven sheet.

Figure 13:
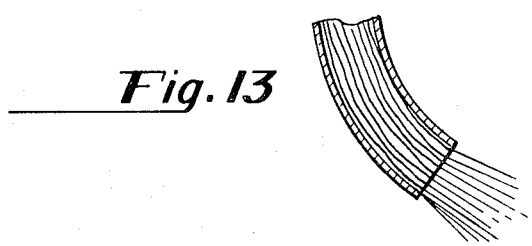
FIG. 13 is a partial longitudinal cross-sectional illustration of a still further embodiment of the apparatus of the present invention.

The apparatus shown in FIG. 13 is characterized in that the lower surface of the nozzle plate 122 is lengthened. The length of the flow passage of the nozzle 124 is considerably lengthened and the tip of the nozzle 124 is funnel-shaped. Furthermore, at the opened end of the funnel-shaped tip a flexible tube 126 is attached. It is important that the flexible tube have a smooth interior and be capable of freely bending. A rubber, synthetic resin or metal flexible tube whose interior is coated with a resin such as ethylene tetrafluoride is preferably used. A flexible tube having length of up to about 2 meters may be used. When the length of the tube 126 is too long, there is a tendency for the opening properties of the filaments to be obstructed.

In the aforementioned embodiments, when the length of the flow passage is especially long and is bent, the filaments are difficult to introduce during start-up. By taking the following steps, however, the start-up operation will be considerably easier. At the time of starting up the spinning, slender wires are inserted into the pressure chamber from the nozzle end and the spun filaments are fed through the nozzles by said wires. The pressure is then gradually raised in the pressure chamber. In an apparatus of the type having a nozzle plate which moves relative to the supporting plate by using a lubricant such as grease on the sliding surface of the nozzle plate and the supporting plate, it is possible to easily move the second nozzle even under pressure.

Synthetic polymers having fiber-forming properties can be used in the process of the present invention. Representative polymers are, for example, polyesters, for example, polyesters, for example, polyethylene terephthalate and polycyclodexanedimethanol terephthalate, polyamides, for example, nylon 6, nylon 66, nylon 8 and nylon 12 and polyolefins, for example, polypropylene and polyethylene.

The present invention achieves remarkable effects upon preparing non-woven sheets especially when utilizing synthethic polymers which were heretofore impossible to highly orient relatively low take-up speeds for example, polyethyleneterephthalate.

The following examples are given by way of illustration of the present invention and are not intended to limit in any way the scope of the sub-joined claims. All parts and percentages are by weight, not volume unless otherwise indicated.

EXAMPLE 1

In this example, apparatus of the type shown in FIG. 3 was employed which had a spinneret plate with 25 spinnerets of a 0.25 mm. diameter and a single 5 mm. exit nozzle. The distance between the spinnerets and the nozzle was set at 1,000 mm. Filaments of nylon 6 having a specific viscosity (measured at 25° C. in 1% sulphuric acid solution) of 2.45 and polyethylene terephthalate $\eta_{OCP}=0.67$ were separately spun at the discharge rates and using compressed air at the pressures shown in Table 1. The results in Table 1 show the denier, tenacity, elongation and shrinkage in boiling water of the filaments that were obtained. Also in Table 1, the jetting out speeds of the filaments are described for references, said values being estimated from the denier of the filaments. Since measurement of denier of filaments is normally conducted at 25° C. and 65° RH, in the case of nylon 6, when the absorption of moisture after spinning is taken into account, the true jetting out speeds would be 3–4% higher that shown in Table 1.

TABLE I

| Polymer | Discharging amount (g./min.) | Air pressure (atg.) | Denier (d.) | Jetting out speed (m./min.) | Tenacity | Elongation | Shrinkage in boiling water (percent) |
|---|---|---|---|---|---|---|---|
| Nylon 6 | 24 | 0.5 | 2.26 | 4,100 | 3.82 | 79.2 | |
|  | 24 | 2.0 | 1.64 | 5,500 | 5.1 | 59.1 | |
|  | 48 | 1.0 | 3.7 | 4,900 | 3.60 | 72.5 | |
|  | 48 | 2.0 | 3.1 | 5,800 | 3.82 | 45.2 | |
| P.E.T. | 24 | 0.5 | 2.26 | 4,100 | 1.91 | 115.2 | 67.6 |
|  | 48 | 1.0 | 2.36 | 7,800 | 1.99 | 78.2 | 59.0 |
|  | 48 | 2.0 | 1.58 | 11,400 | 3.42 | 70.5 | 14.0 |
|  | 48 | 3.9 | 1.79 | 10,100 | 4.14 | 68.2 | 2.5 |

At a position 80 cm. below the nozzle plate, a wire mesh conveyor belt was provided to catch and collect the filaments so as to form a non-woven sheet. The filaments which comprised the non-woven sheet were found to be randomly disposed. A synthetic film was then applied to the sheet so as to form a substrate for an artificial leather.

EXAMPLE 2

Polyethylene terephthalate $\eta_{OCP}$ 0.63 filaments were spun in an apparatus of the type shown in FIG. 5 having a spinneret plate having 24 spinnerets of 0.25 mm. diameter and one exit nozzle of 4 mm. diameter. The distance between the spinneret and the nozzle was set at 500 mm. ($L_1$=400 mm. and $L_2$=100 mm.). A lead radius was provided on the entrance side of the nozzle which had a 5 mm. radius. The length of the flow passage of the second nozzle was varied as shown in Table 2. The characteristics of the filaments jetted out from the nozzle including the tenacity, elongation, double refraction and shrinkage in boiling water are shown in Table 2.

TABLE 2

| Length of the flow passage (mm.) | Jetting out speed (m./min.) | Tenacity (g./d.) | Elongation (percent) | Double refraction | Shrinkage in boiling water (percent) |
|---|---|---|---|---|---|
| 0 | 4,250 | 2.54 | 58.2 | 0.064 | 2.0 |
| 10 | 4,330 | 2.62 | 63.2 | 0.079 | 2.7 |
| 20 | 4,310 | 3.01 | 75.9 | 0.081 | 1.7 |
| 40 | 5,290 | 3.24 | 51.2 | 0.081 | 0.8 |
| 60 | 5,700 | 3.14 | 44.6 | 0.065 | 3.6 |
| 100 | 5,930 | 3.52 | 47.0 | 0.105 | 1.0 |
| 150 | 5,630 | 4.11 | 48.9 | 0.070 | 3.8 |
| 200 | 6,250 | 3.92 | 51.2 | 0.089 | 2.2 |
| 250 | 6,620 | 4.84 | 46.1 | 0.128 | 2.1 |
| 300 | 7,640 | 4.42 | 40.5 | 0.141 | 2.8 |

It is apparent from Table 2 that when the length of the flow passage of the second nozzle exceeded 20 mm., the tenacity of the filaments was improved. Further, when the length exceeded 40 mm. and the jetting out speed exceeded 5,000 m./min., in improvement of both the tenacity and the elongation was recognized. Further, when a non-woven sheet formed by catching and collecting the filaments jetted out from the second nozzle was subjected to an adhering process, the obtained sheet had better tensile properties when the length of the flow passage of the nozzle was longer.

EXAMPLE 3

Polyethylene terephthalate $\eta_{OCP}$ 0.63 was spun in apparatus of the type shown in FIG. 5 having a spinneret plate with 18 spinnerets of 0.25 mm. diameters and a single 4 mm. diameter nozzle having a flow passage length of 100 mm. The pressure of the compressed air was maintained at 3 atg. The distance between the spinnerets and the nozzle and the discharging amount per spinneret was varied as shown in Table 3.

TABLE 3

| Run No. | MM (g./min.) | L (m.) | Spinning situation | Jetting out speed (m./min.) | Denier of a single filament (d.) | Tenacity (g./d.) | Elongation (percent) | Shrinkage in boiling water (percent) |
|---|---|---|---|---|---|---|---|---|
| 1 | 0.7 | 0.5 | Breaking occurred often. | | | | | |
| 2 | 0.9 | 0.25 | Fused | | | | | |
| 3 | 0.9 | 0.4 | Good | 5,800 | 1.4 | 3.30 | 45.2 | 2.6 |
| 4 | 0.9 | 0.5 | do | 6,500 | 1.3 | 3.18 | 43.6 | 2.5 |
| 5 | 0.9 | 0.7 | do | 3,850 | 2.1 | 3.28 | 77.3 | 3.5 |
| 6 | 1.5 | 0.5 | do | 5,600 | 2.4 | 3.23 | 49.0 | 2.8 |
| 7 | 1.5 | 0.7 | do | 5,600 | 2.4 | 3.92 | 63.7 | 3.1 |
| 8 | 1.5 | 1.1 | do | 4,500 | 3.0 | 3.42 | 72.5 | 5.1 |
| 9 | 2.0 | 0.25 | Fused | | | | | |
| 10 | 2.0 | 0.4 | Good | 6,100 | 3.0 | 3.20 | 50.3 | 2.2 |
| 11 | 2.0 | 0.5 | do | 6,000 | 3.0 | 3.18 | 49.6 | 2.0 |
| 12 | 2.0 | 0.7 | do | 3,700 | 4.9 | 3.86 | 53.3 | 2.0 |
| 13 | 2.0 | 1.1 | do | 5,150 | 3.5 | 3.84 | 62.1 | 3.3 |
| 14 | 2.5 | 2.0 | do | 4,250 | 5.3 | 3.19 | 74.2 | 6.8 |
| 15 | 3.2 | 0.5 | do | 6,000 | 4.8 | 3.40 | 50.5 | 1.4 |
| 16 | 3.2 | 0.7 | do | 6,250 | 4.6 | 3.75 | 52.7 | 1.8 |
| 17 | 3.2 | 1.1 | do | 5,300 | 5.4 | 3.78 | 63.5 | 3.3 |
| 18 | 3.2 | 2.0 | do | 5,150 | 5.6 | 3.51 | 67.5 | 3.5 |

EXAMPLE 4

In this example, apparatus of the type shown in FIG. 5 was employed having 9 spinnerets of 0.25 mm. diameter and one nozzle of 4 mm. diameter. The length of the flow passage of the nozzle was set at 100 mm. and air pressure was employed of about 3 atg. The distance between the spinneret and the nozzle and the discharging amount per spinneret was varied as shown in Table 4. Using this apparatus, polyethylene terephthalate $\eta_{OCP}$=0.63 was spun into filaments. The denier, tenacity, elongation and shrinkage in boiling water of the filaments thus obtained were evaluated. These values are shown in Table 4.

TABLE 4

| Run No. | MM (g./min.) | L (m.) | Spinning situation | Jetting out speed (m./min.) | Denier of a single filament (d.) | Tenacity (g./d.) | Elongation (percent) | Shrinkage in boiling water (percent) |
|---|---|---|---|---|---|---|---|---|
| 1 | 4.5 | 0.5 | Good | 6,300 | 6.4 | 3.62 | 43.8 | 1.2 |
| 2 | 4.5 | | do | 6,200 | 6.5 | 3.80 | 50.7 | 1.9 |
| 3 | 4.5 | 1.1 | do | 5,100 | 7.9 | 3.66 | 63.3 | 3.5 |
| 4 | 5.4 | 0.5 | Fused | | | | | |
| 5 | 5.4 | 0.7 | Good | 6,500 | 7.5 | 3.50 | 43.2 | 0.2 |
| 6 | 5.4 | 1.1 | do | 5,600 | 8.7 | 3.68 | 62.3 | 1.8 |
| 7 | 5.4 | 2.0 | do | 5,520 | 8.8 | 3.41 | 64.2 | 2.8 |
| 8 | 6.5 | 0.7 | Fused | | | | | |
| 9 | 6.5 | 1.1 | Good | 5,700 | 10.3 | 3.45 | 59.0 | 0.3 |
| 10 | 6.5 | 2.0 | do | 5,620 | 10.4 | 3.62 | 57.2 | 1.8 |
| 11 | 8.0 | 1.1 | do | 6,100 | 11.8 | 3.71 | 53.0 | 0.1 |
| 12 | 8.0 | 2.0 | do | 5,800 | 12.4 | 3.52 | 54.1 | 1.4 |
| 13 | 8.5 | 1.1 | Fused | | | | | |
| 14 | 12.0 | 2.0 | Good | 6,030 | 17.9 | 3.56 | 50.3 | 0.8 |
| 15 | 13.5 | 2.0 | Fused | | | | | |

EXAMPLE 5

In this example, apparatus of the type shown in FIG. 7 was employed having 24 spinnerets of an 0.3 mm. diameter and a single exit nozzle of 3 mm. The pressure of the compressed air was maintained at 3 atg. while feeding approximately 400 liter/min. of air. The distance between the spinnerets and the second nozzle was set at 100 cm. The internal inclined angle $\theta$ of the nozzle was 90°. The inner diameter of the pressure chamber was 70 mm. The distance between the spinneret plate and the orifices for the compressed air was selected so as to become 40%, 60% and 80% of the distance between the spinneret plate and the nozzle. The discharging amount of each of the spinnerets was set at 72 g./min. Using this apparatus, polyethylene terephthalate was melted at 280° C. and spun into filaments. The results of this example are shown in Table 5.

TABLE 5

| $L_1$ (cm.) | 40 | 60 | 80 |
|---|---|---|---|
| Spinnability | (1) | Good | Good |
| Elongation (percent) | 170 | 91 | 76 |
| Shrinkage in boiling water (percent) | 4.3 | 6.3 | 3.7 |

1 Fusion occurred.

EXAMPLE 6

Example 5 was repeated with the exception that the amount of the molten polyethylene terephthalate discharged from each of the spinnerets was set at 30 g./min., L was made 50 cm., $L_1$ was made 20 cm., 30 cm. and 40 cm. and $\theta$ was set at 90°, 170° and 200°. The characteristics of the filaments which were obtained are shown in Table 6.

TABLE 6

| $L_1$ (cm.) | 20 | 30 | 40 |
|---|---|---|---|
| $\theta = 90°$ | X | O | O |
| $\theta = 170°$ | X | O | O |
| $\theta = 200°$ | | Δ | Δ |

In Table 6, the O indicates that the filaments reach the objection of having an elongation less than 100% and a shrinkage in boiling water less than 5%. An X mark indicates that the two characteristics were difficult to obtain. A Δ mark indicates cases wherein at least one of the desired characteristics was not obtained.

EXAMPLE 7

In this example, apparatus of the type shown in FIG. 8 was employed with the exception that the nozzle plate was replaced with a nozzle plate having three separate nozzles such as is shown in FIG. 9b. The number of spinnerets used was 24 with the diameter of each of the spinnerets being 0.5 mm. The diameter of each of the nozzles was 4 mm. The distance between the spinneret plate and the nozzle plate was set at 60 cm. The inner diameter of the pressure chamber was 15 cm. At a position slightly lower than the intermediate point between the spinneret plate and the nozzle plate a 5 cm. wide porous metal strip was provided for introducing the compressed air. The pressure of the compressed air was maintained at 3 atg. and the temperature was held at 30° C. Molten polyethylene terephthalate at 280° C. was extruded from the spinnerets at a discharge amount of 60 g./min. The filaments jetted out from the nozzles consisted of a group of filaments of about 8 denier. The filaments had a tenacity of 3.4 g./d., a changing ratio of the tenacity of 16%, an elongation of 87%, a changing ratio of elongation of 17%, and the shrinkage in boiling water of a non-woven sheet formed from the filaments was 2% in the longitudinal direction and 3% in the traverse direction. A 50 cm. wide sheet was caught and collected on a net conveyor and the changing coefficient of the deviation of the thickness of the sheet in the direction of advancement was found to be 9.6%. The weight of the sheet was found to be an average of approximately 100 g./m.² The changing coefficient of the deviation of the thickness was obtained by measuring the sheet at 1 cm. interval using a dial type thickness gauge having a contacting portion which consisted of a disk of a 5 mm. diameter.

In order to illustrate the advantages of using a plurality of nozzles, the above process was repeated with the exception that the nozzle plate of the apparatus used above was replaced with a nozzle plate having one nozzle. Using this apparatus, molten polyethylene terephthalate was spun and a non-woven sheet was prepared from the spun fibers. The filaments obtained at this time were of an average 8 denier, having a tenacity of 3.3 g./d., a changing coefficient of the tenacity of 23%, an elongation of 120%, a changing coefficient of elongation of 37% and the sheet obtained at this time had a shrinkage in boiling water of 5.9% in the longitudinal direction and 13% in the traverse direction. The width of the sheet formed by the filaments caught and collected was about 25 cm. and the deviation of the thickness of the sheet was 25% by a changing coefficient.

EXAMPLE 8

In this example, apparatus of the type shown in FIG. 10 was employed having a spinneret plate having 24 spinnerets of 0.23 mm. diameter and a single 3 mm. nozzle. The flow passage of the nozzle was set at 100 mm. in length. The distance between the spinneret and the nozzle was set at 500 mm. Polyethylene terephthalate having an $\eta_{OCP}$ of 0.60 was discharged from the spinnerets at 320° C. at a rate of 24 g./min. per spinneret. The pressure of the compressed air and the inclined angle of the second nozzle were selected as shown in Table 7. The results are shown by way of denier, tenacity, elongation and dry heat shrinkage in Table 7. The inclined angle of the nozzle is the angle formed by the central axis of the pressure chamber and the central axis of the nozzle.

TABLE 7

| Air pressure (atg.) | Inclining angle of the nozzle (degree) | Jetting out speed of the filaments (m./min.) | Denier | Tenacity (g./d.) | | Elongation (percent) | | Dry heat shrinkage at 180° C. (percent) |
|---|---|---|---|---|---|---|---|---|
| | | | | Untreated | Heat treated at 180° C. | Untreated | Heat treated at 180° C. | |
| 3.0 | 0 | 6,640 | 1.36 | 3.17 | 3.34 | 31.4 | 34.5 | 2.5 |
| | 10 | 5,900 | 1.53 | 2.85 | 3.39 | 38.4 | 44.8 | 2.5 |
| | 20 | 5,000 | 1.80 | 2.71 | 2.77 | 47.0 | 48.6 | 3.0 |
| | 30 | 4,850 | 1.86 | 3.05 | 3.06 | 57.7 | 59.4 | 4.7 |
| 4.0 | 0 | 6,380 | 1.41 | 3.81 | 3.67 | 33.9 | 33.6 | 2.1 |
| | 10 | 5,980 | 1.50 | 3.41 | 3.52 | 41.0 | 45.8 | 2.9 |
| | 20 | 5,510 | 1.63 | 3.19 | 3.28 | 42.1 | 49.2 | 2.8 |
| | 30 | 5,050 | 1.18 | 3.25 | 3.30 | 51.8 | 52.4 | 5.1 |

Non-woven sheets were made by using the conventional ejector process. The properties are shown in Table 8. These results were obtained by spinning a molten polymer under conditions the same as those noted above using a spinneret plate having 24 spinnerets of 0.23 mm. diameter. An ejector was provided having an inner diameter of 3 mm. at a position 500 mm. below the spinneret. The pressure of the air fed into the ejector and the inclined angle of the ejector are shown in Table 8.

TABLE 8

| Air pressure (atg.) | Inclining angle of the ejector (degree) | Jetting out speed of the filaments (m./min.) | Denier | Tenacity, (g./d.) untreated | Elongation (%), untreated | Dry heat shrinkage at 180° C. (%) |
| --- | --- | --- | --- | --- | --- | --- |
| 1.0 | 0 | 2,500 | 3.6 | 2.51 | 136 | 31 |
|     | 10 | 2,140 | 4.2 | 2.62 | 118 | 22 |
|     | 20 | 1,920 | 4.7 | 2.38 | 163 | 26 |
|     | 30 | 1,760 | 5.1 | 2.31 | 171 | 30 |
| 2.0 | 0 | 2,800 | 3.2 | 2.78 | 140 | 17 |
|     | 10 | 21430 | 3.7 | 2.61 | 132 | 23 |
|     | 20 | 2,640 | 3.4 | 2.83 | 151 | 27 |
|     | 30 | 2,370 | 3.8 | 2.80 | 182 | 25 |
| 3.0 | 0 | 3,600 | 2.5 | 2.90 | 98 | 13 |
|     | 10 | 3,300 | 2.7 | .3.12 | 107 | 14 |
|     | 20 | 3,100 | 2.9 | 3.00 | 123 | 14 |
|     | 30 | 3,330 | 2.7 | 2.98 | 141 | 18 |
| 4.0 | 0 | 4,280 | 2.1 | 3.18 | 63 | 4 |
|     | 10 | 4,090 | 2.2 | 3.02 | 71 | 6 |
|     | 20 | 4,090 | 2.2 | 3.07 | 82 | 7 |
|     | 30 | 4,290 | 2.1 | 3.14 | 85 | 9 |

It is apparent from the comparison of the properties shown in Table 7 and Table 8, that in the ejector process the influences exerted by the inclination of the ejector over the yarn were remarkably large, especially the rise in the heat shrinkage and the lowering of the yarn quality after heat treatment. However, in the process according to the present invention, lowering of the yarn quality due to oscillation of the second nozzle was hardly noticeable. It was possible to positively shake the second nozzle to form a non-woven sheet. The present invention is very advantageous for extending the jetted out filaments in any direction and to any width so as to form wide sheets.

EXAMPLE 9

In apparatus of the type shown in FIG. 12, six devices for jetting out filaments were arranged at regular intervals in a traverse direction. At a position 600 mm. below the jetting tips of the nozzles of the devices, a seven mesh net conveyor was positioned so as to move at right angles to the jetting out devices. Connecting rods were secured respectively so as to cause an oscillation motion at a ratio of one reciprocation per second at an angle of ±5° at right angles to the conveyor. The filaments jetted out from the respective nozzles were caught and collected on the net conveyor to form a non-woven sheet. In each of said devices, the number of spinnerets was 24 and the diameter of the spinnerets was 0.23 mm. The diameter of the nozzles was 3 mm. The length of the flow passage and the distance between the first nozzle and the second nozzle was made 500 mm. Polyethylene terephthalate having $\eta_{OCP}$ of 0.69 was discharged from the spinnerets at a discharging amount of 24 g./min. and a temperature of 320° C. On the under side of the net conveyor, a suction box having 100 mm. x 1800 mm. opened surface was provided and the non-woven sheet was drawn down by the suction plate. The transferring speed of the conveyor was set at 80 cm./min. A sheet of about 100 g./m.$^2$ was obtained having a uniform thickness over a width of about 170 cm. By subjecting this sheet to treatments with an adhesive, a non-woven sheet was obtained consisting of continuous filaments having a tensile strength of 3-4 kg./cm.$^2$.

EXAMPLE 10

In this example, apparatus of the type shown in FIG. 13 was employed having 24 spinnerets with the diameter of each of the spinnerets being 0.25 mm., a nozzle of 4 mm. diameter and a length of the flow passage was set at 10 cm. The diameter of the flexible tube was 40 mm. The length of the flexible tube was 20 cm. The distance between the spinnerets and the second nozzle was 50 cm. Using this apparatus, polyethylene terephthalate having an $\eta_{OCP}$ of 0.68 was extruded at a discharging amount of 24 g./min. and a temperature of 320° C. from the first nozzle. Selecting the pressure of the compressed air and the radius of curvature of the flexible tubes as shown in FIG. 9 filaments were jetted from the nozzle. The characteristics of the obtained filaments including the denier tenacity, elongation and shrinkage in boiling water are shown in Table 9.

TABLE 9

| Air pressure (atg.) | Radius of curvature (mm.) | Jetting out speed (m./min.) | Denier | Tenacity (g./d.) | Elongation (percent) | Shrinkage in boiling water (percent) |
| --- | --- | --- | --- | --- | --- | --- |
| 2.0 | ---- | 7,050 | 1.28 | 4.21 | 40.5 | 1.6 |
|     | 600 | 4,420 | 2.04 | 3.26 | 57.4 | 5.5 |
|     | 450 | 4,080 | 2,21 | 1.78 | 50.1 | 4.1 |
|     | 300 | 3,690 | 2.44 | 2.81 | 78.1 | 10.1 |
| 3.0 | ---- | 6,720 | 1.34 | 3.69 | 43.8 | 1.8 |
|     | 600 | 4,810 | 1.87 | 3.16 | 61.4 | 6.2 |
|     | 450 | 4,120 | 2.19 | 3.48 | 62.1 | 5.8 |
|     | 300 | 3,700 | 2.43 | 3.12 | 70.9 | 9.0 |
| 4.0 | ---- | 6,310 | 1,43 | 3.46 | 44.6 | 2.4 |
|     | 600 | 4,180 | 2.15 | 3.10 | 66.2 | 4.2 |
|     | 450 | 3,720 | 2.42 | 3.28 | 70.5 | 8.9 |
|     | 300 | 3,480 | 2.59 | 2.92 | 72.9 | 14.2 |

EXAMPLE 11

In this example, apparatus of the type shown in FIG. 13 was used having 24 spinnerets, the diameter of each of the spinnerets being 0.25 mm. and a 4 mm. diameter nozzle. The length of the flow passage of the nozzle was 20 cm. The diameter of the flexible tube was 20 mm. The length of the flexible tube was 50 cm. The distance between the spinnerets and the second nozzle was 50 cm. Using this apparatus, polyethylene terephthalate having an $\eta_{OCP}$ of 0.63 was extruded at a discharging amount of 24 g./min. and a temperature of 320° using compressed air at a pressure of 3 atg. The filaments were jetted out of the flexible tube. Even when the flexible tube was bent, a substantial lowering of the jetting out speed was not noticed and the jetting out speed was 6,000–6,800 m./min. The tenacity of the filaments was 2.0–3.7 g./d. and the elongation thereof was 35–55%.

According to the present invention, it is possible to jet out the filaments at any position in any direction while still maintaining a high jetting out speed which is sufficient for highly oriented filaments. The present invention is unique in that it can be used in methods which have heretofore been impossible with the conventional ejector process. While the present invention is especially useful for forming conventional non-woven sheets, the present invention is capable of being utilized efficiently for the direct shaping of clothing or partial shaping such as taffeting.

What is claimed is:

1. The apparatus for the manufacture of continuous filaments from a synthetic polymer comprising in combination: an elongated closed chamber having a hot melt extrusion means at the upper end thereof, said means comprising a spinneret having many orifices, an exit means having at least one nozzle at the lower end thereof and a compressed fluid distribution means having orifices in communication with the interior of said chamber below a point at least one-half of the distance from the lower surface of the extrusion means to the upper surface of the exit means; said extrusion means being adapted to hot melt extrude filaments of said polymer into the interior of said chamber in a downward direction towards and ultimately through said nozzle of the exit means; said distribution means being adapted to continuously introduce into the interior of said chamber through said orifices, the fluid under pressure in an amount sufficient to cool and solidify the extruded filaments before reaching said nozzle while maintaining the pressure in the interior of said chamber higher than the pressure outside of said chamber and providing a volume of said fluid sufficient to cause said filaments to be jetted out of said nozzle along with said fluid at a rate sufficient to increase the orientation of the solidified filaments.

2. The apparatus according to claim 1 wherein the nozzle is at least 20 mm. in length.

3. The apparatus according to claim 1 wherein said extrusion means includes a plurality of spinnerets and said exit means includes a plurality of nozzles whereby the filaments from preselected spinnerets can be jetted from preselected nozzles so as to obtain a better distribution of the jetted out filaments.

4. The apparatus according to claim 1 wherein said nozzle is movable relative to said chamber.

5. The apparatus according to claim 1 wherein said exit means is comprised of a cylindrical member which is rotatably mounted on the lower end of said chamber and has defined therein a nozzle whose central axis is oblique to the axis of rotation of the cylindrical member whereby by rotating the cylindrical member on its central axis the jetting out direction of the nozzle is rotated.

6. The apparatus according to claim 1 wherein the exit means is comprised of a mounting plate which is secured to the lower end of said chamber and has a spherical seat defined therein, and a spherical nozzle plate which is rotatably mounted in the spherical seat of the mounting plate, said spherical nozzle plate having defined therein a nozzle whereby when the spherical nozzle plate is rotated in the mounting plate the jetting out direction of the nozzle is likewise rotated.

7. The apparatus according to claim 1 wherein a flexible tube is secured to the exit end of the nozzle.

8. The apparatus according to claim 1 which further includes means for receiving and forming the filaments jetted out from said nozzle into a non-woven sheet.

9. The apparatus for the manufacture of non-woven materials comprised of a plurality of the apparatuses of claim 1 and means for receiving the filaments jetted out from said nozzle.

10. The apparatus according to claim 9 wherein said nozzles are attached to a connecting means which is adapted to be moved relative to said means for receiving the filaments whereby distribution of the jetted out filaments is more uniform on said receiving means.

11. The apparatus for the manufacture of continuous filaments from a synthetic polymer comprising in combination: an elongated closed chamber having a length L in meters with a hot melt extrusion means at the upper end thereof for extruding filament at a rate of extrusion per filament, M, in g./min.; an exit means having at least one nozzle at the lower end thereof and a compressed fluid distribution means having orifices in communication with the interior of said chamber at a point at least one half of the distance from the lower surface of the extrusion means to the upper surface exit means; said extrusion means being adapted to hot melt extrude filaments of said polymer into the interior of said chamber in a downward direction towards and ultimately through said nozzle of the exit means; said distribution means being adapted to continuously introduce into the interior of said chamber through said orifices, the fluid under presure in an amount sufficient to cool and solidify the extruded filaments before reaching said nozzle while maintaining the pressure in the interior of said chamber higher than the pressure outside of said chamber and providing a volume of said fluid sufficient to cause said filaments to be jetted out of said nozzle along with said fluid at a rate sufficient to increase the orientation of the solidified filaments with the rate of extrusion M in g./min. and the length L in meters being maintained in the following relationship:

$$1.5L + 0.05 \leq M \leq 5.5L + 2.25$$

$$L \geq 0.30$$

12. The process for the manufacture of filaments from a synthetic linear polymer comprising the steps of hot melt extruding the synthetic linear polymer into filaments; advancing the filaments through a first zone maintained at a first pressure by the continuous feeding of a compressed fluid to said first zone; cooling and solidifying the filaments with said compressed fluid and thereafter jetting the filament from said first zone to a second zone which has a lower pressure than said first zone at a rate sufficient to orient the extruded filaments.

13. The process according to claim 12 wherein the rate of extrusion per filament, M, in g./min. and the length of the first zone, L in meters, are maintained in the following relationship $$1.5L + 0.05 \leq M \leq 5.5L + 2.25$$

$$L \geq 0.30$$

References Cited

UNITED STATES PATENTS

| | | | |
|---|---|---|---|
| 2,582,561 | 1/1952 | Peyches | 18—2.5 RR |
| 3,447,202 | 6/1969 | Kato | 264—210 F |
| 3,527,851 | 9/1970 | Bulgin | 264—40 |
| 2,252,684 | 8/1941 | Babcock | 264—176 F |
| 3,224,852 | 12/1965 | Stalego | 264—176 F |
| 3,304,163 | 2/1967 | Holschlag | 264—176 F |
| 3,309,734 | 3/1967 | Bynum et al. | 264—176 F |
| 3,379,811 | 4/1968 | Hartmann et al. | 264—176 F |
| 3,441,468 | 4/1969 | Siggel et al. | 264—176 F |
| 3,509,009 | 4/1970 | Hartmann | 264—177 F |
| 3,389,444 | 6/1968 | Fletcher et al. | 28—1 |

FOREIGN PATENTS

| | | | |
|---|---|---|---|
| 22,333 | 9/1968 | Japan | 264—176 F |
| 30,017 | 12/1968 | Japan | 264—176 F |
| 12,848 | 6/1969 | Japan | 264—176 F |
| 1,333 | 1/1967 | Japan | 264—181 |
| 239,913 | 5/1960 | Australia | 264—176 F |

JAY H. WOO, Primary Examiner

U.S. Cl. X.R.

28—1.4, 71.3; 264—176 F; 425—66, 72, 80, 83